July 17, 1951  L. D. JOHNSON  2,561,204
PRESSURE GAUGE
Filed April 5, 1948   3 Sheets-Sheet 1
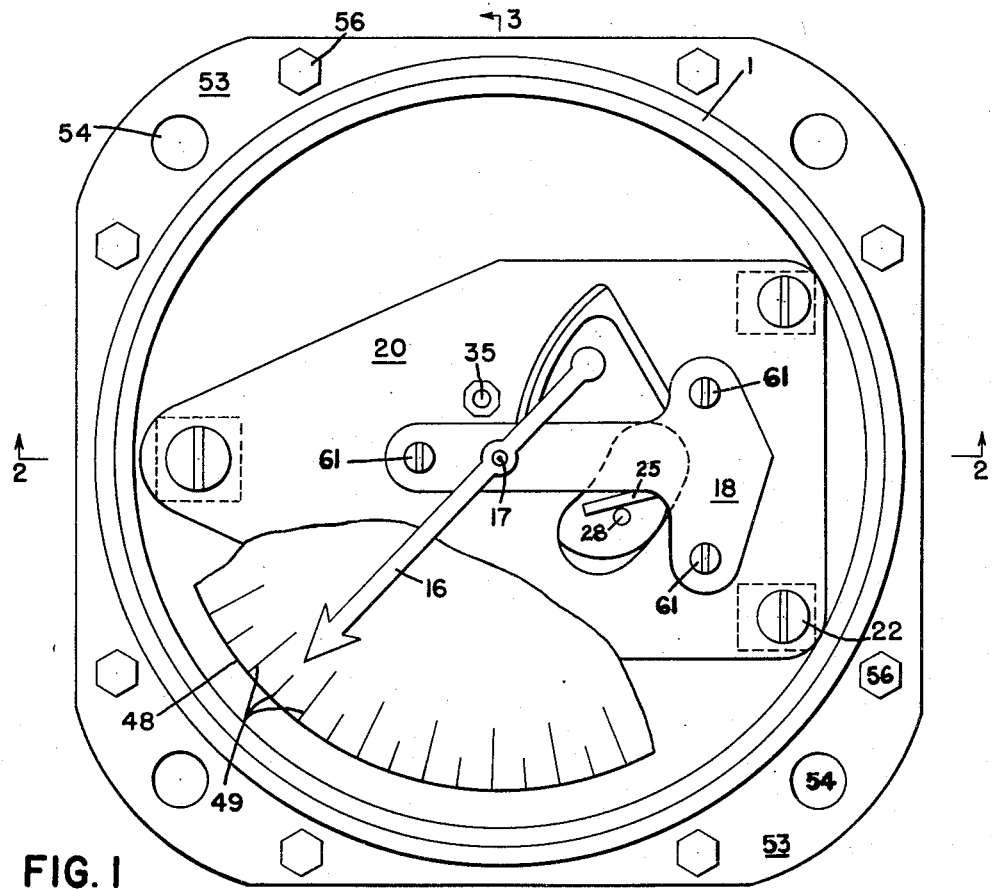
FIG. I
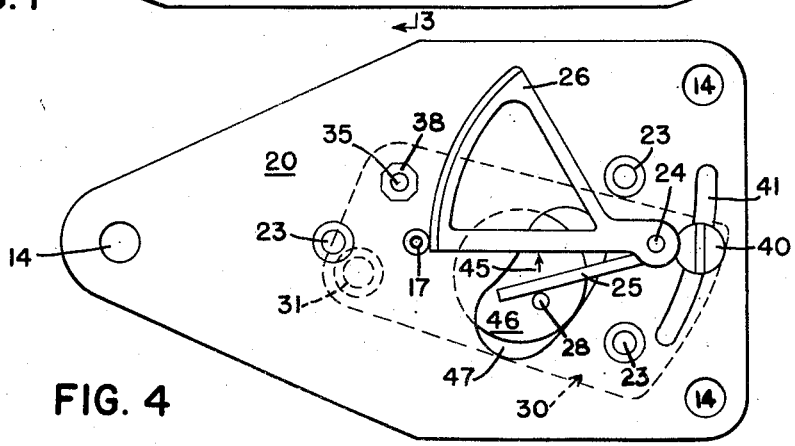
FIG. 4
INVENTOR.
LEON D. JOHNSON
BY Bruno C. Lechler
ATTORNEY July 17, 1951  L. D. JOHNSON  2,561,204
PRESSURE GAUGE Filed April 5, 1948   3 Sheets-Sheet 2

INVENTOR.
LEON D. JOHNSON

BY *Bruno C Lechler*

ATTORNEY

July 17, 1951  L. D. JOHNSON  2,561,204
PRESSURE GAUGE
Filed April 5, 1948  3 Sheets-Sheet 3

INVENTOR.
LEON D. JOHNSON
BY Bruno C. Lechler
ATTORNEY

Patented July 17, 1951

2,561,204

UNITED STATES PATENT OFFICE 2,561,204

PRESSURE GAUGE

Leon D. Johnson, Sellersville, Pa., assignor to American Machine and Metals, Inc., New York, N. Y., a corporation of Delaware Application April 5, 1948, Serial No. 18,881

2 Claims. (Cl. 73—410)

This invention relates to pressure gauges indicating the absolute pressure in a container. The interior of the gauge housing forms a sealed chamber having means for connection with the container whose absolute pressure is to be measured. The housing contains pressure responsive elements, such as evacuated hollow diaphragms. The diaphragms have their unstressed thickness or height when the housing is exhausted to a predetermined low absolute pressure value, but are in a deflated condition when the pressure in the housing is above and in an inflated condition when this pressure is below said predetermined value. The expansions and contractions of the diaphragms normal to their faces move a mechanical motion transmitting system which magnifies the motions and converts them into the movement of a pointer over a dial.

It is an object of the invention to provide a pressure gauge of the kind referred to in which the movements of a pressure responsive unit in axial direction are converted into angular movements of a rock shaft extending perpendicularly to the direction of the movements of said pressure responsive unit.

A further object of the invention is to provide in a pressure gauge of the kind referred to, which uses a member participating in the axial movements of the pressure responsive unit, adjustability of that member parallel to the axial direction of the pressure responsive unit for varying the distance of the point at which said member bears against the one of the two levers carried by the rock shaft from the axis of said rock shaft.

Other objects and advantages of the invention will appear as the description proceeds, reference being had to the accompanying drawings, in which—

Fig. 1 is a top view of the absolute pressure gauge, the dial being shown partly broken away to reveal parts below;

Fig. 4 is a plan view along line 4—4 in Fig. 2 showing the top plate and an adjustable sub-plate attached thereto.

Figure 5:
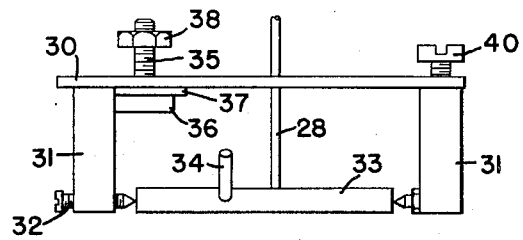
Fig. 5 is a side elevation of the sub-plate assembly.

The housing, which is cup-shaped, is indicated at 1 and has a flange 50 at its upper end. A cover 2 fits over the flange 50 and holds in place a glass disc 3 supported between gaskets 51. The cover 2 and the housing 1 may be provided with flanges 53 having mating holes 54 through which bolts may be passed to secure the absolute pressure gauge on a dash board mounting or the like. The cover 2 and the housing 1 are firmly held together by bolts and nuts 56. A main casting 4, which is attached in any desired manner to the bottom of the housing 1, supports a pressure responsive mechanism, generally indicated at 5. This mechanism may consist of a number of inter-connected diaphragms 6, each consisting of two cup-shaped stampings 7 joined at their flanges and having openings at the center. The adjacent openings are joined to form a tubular connection 8 so that the interiors of all the diaphragms form one interconnected space, hermetically sealed from the outside atmosphere. The diaphragms 6 are supported at 10 on the casting 4. Connected to the hermetically sealed space in the series of diaphragms 6 is a small tube 11 through which air is exhausted from said space to establish therein a desired sub-atmospheric pressure and which thereafter is sealed off. For connection of the container (not shown) whose pressure is to be measured with the interior of the housing 1, there is provided a pipe 9 tapped into an insert 55 of the housing 1.

Depending on the degree to which the hermetically sealed interior of the interconnected diaphragms 6 is exhausted, the outside pressure existing in the housing 1 which surrounds the diaphragm unit 5 will either allow the diaphragms to expand or will compress the diaphragms or will leave them in neutral position. The diaphragms will expand when the pressure in the housing 1 is below the pressure to which the interior of the diaphragm unit is evacuated; they will contract if the pressure in the housing 1 is higher than the pressure within the diaphram unit, and the faces of the diaphragms will remain flat when the pressure in the housing 1 is the same as in the diaphragm unit 5.

Figure 2:
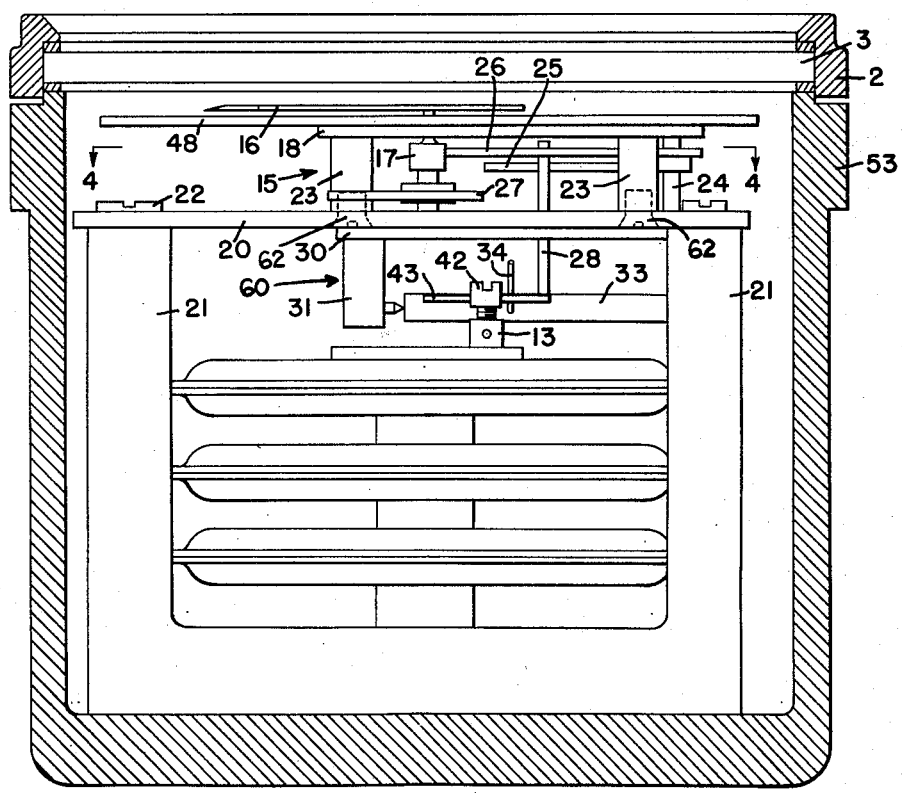
Fig. 2 is an elevation of the gauge mechanism with the casing in section on line 2—2 of Fig. 1.

The uppermost of the diaphragms 6 carries a disc 12 which has attached thereto a vertical post 13. From this post the vertical movement of the series of diaphragms 6 that results from the changes in the pressure inside of housing 1 is transmitted to the pressure-indicating mechanism by means of a motion-transmitting unit, generally indicated at 60 in Fig. 2 and shown separately in Fig. 5. This unit 60 converts the vertical movement of the post 13 into a motion in a plane normal to said vertical movement. The horizontal motion thus obtained operates the conventional type of gauge indicating mechanism, generally indicated at 15 in Fig. 2.

The indicating mechanism 15 includes the usual pointer 16 carried on a spindle 17 integral with a pinion. The spindle 17, together with the other movable parts of the indicating mechanism 15, is supported between a top plate 18 and a bottom plate 20. The bottom plate 20 is supported on three posts 21 extending upwardly from the main portion of casting 4 by means of screws 22 passing through holes 14 in the plate 20. The top plate 18 is spaced from the bottom plate 20 by three columns 23 to which the top plate is attached by flat headed screws 61, each entering a tapped hole in the top of the corresponding column 23 and to which the bottom plate is secured by flat headed screws 62 each entering a hole in the bottom of the corresponding column 23. These same top and bottom plates 18, 20 support an arbor 24 which carries a horizontal arm 25 as well as a gear segment 26, the latter engaging the pinion on the spindle 17. The top plate 18 supports a dial 48 having graduations 49. A light coil spring 27 anchored at one end to one of the posts 23 and at its other end to the pinion shaft 17 tends to turn the pinion shaft 17 clockwise, as seen in Fig. 4, and the gear segment 26 counter-clockwise. The arm 25 will also move counter-clockwise until it engages an obliquely upwardly extending pin 28, into whose path the arm 25 projects.

The upwardly extending pin 28 forms part of the motion-transmitting unit 60. This unit comprises a sub-plate 30 which is adjustably supported on the underside of the bottom plate 20 by a stud 35 and has a circular hole 46 through which the pin 28 projects. The pin 28 extends also through the bottom plate 20 which for that purpose is provided with an elongated hole 47. The stud 35 has an enlarged head 36 at its lower end and a nut 38 at its upper end. The head 36 bears against a friction washer 37 which presses the sub-plate 30 against the underside of the bottom plate 20 while still permitting the sub-plate assembly shown in Fig. 5 to be rotated about stud 35. Depending from the sub-plate 30 are two posts 31. Each post carries a horizontal adjustable pivot 32. A rock shaft 33 is supported between these pivots, and carries the upwardly extending pin 28 and also a pin 34. A stud 40 extends through a curved slot 41 in the base plate 20 down into the top of one of the posts 31 carried by the sub-plate 30. Thus, the sub-plate 30 may be adjusted angularly relative to the base plate 20 by swinging it about stud 35 and then tightening stud 40. In this manner, the rock shaft 33 may be made parallel to a line joining arbor 24 and pinion 17, in Fig. 4, or it may be set at a slight angle to this position. If the pin 34 is turned upwardly by means of a pin 43 carried by the post 13, the rock shaft 33 will move the pin 28 in the direction of the arrow 45 in Fig. 4. Thus, the top of the pin 28 will press against the pin 25, and this will turn the segment 26 clockwise and the spindle 17 counterclockwise against the resistance of the hair spring 27. The relative position of the pins 28 and 34 and the elements 25 and 43, with which these pins are respectively to cooperate, as well as the hairspring 27 are chosen so that contact between said cooperating parts will not occur while the pressure in the housing 1 is above a predetermined value, e. g. 10 inches absolute. This may be the same pressure as that to which the interior of the diaphragm unit 5 is evacuated.

Figure 3:
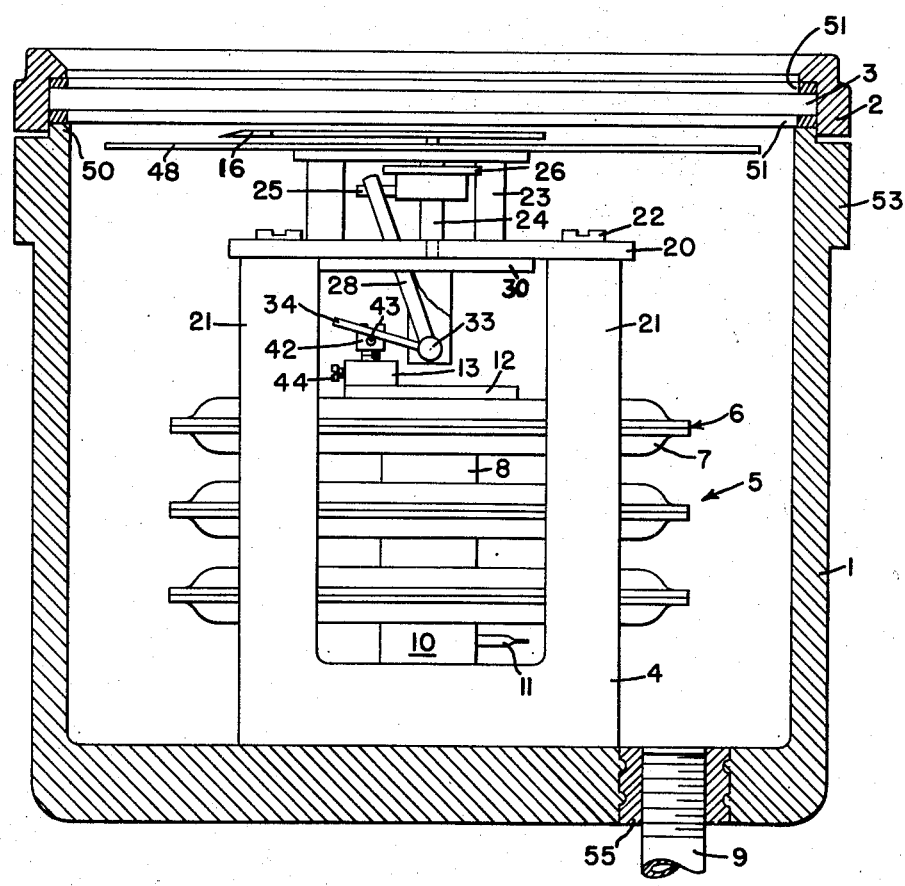
Fig. 3 is an elevation of the interior of the pressure gauge taken at right angles to Fig. 2 with the casing cut along line 3—3 in Fig. 1.

The position of the pin 43 which transmits the vertical movement of the post 13 to the pin 34 is adjustable. This pin 43 extends through the head of a stud 42 that is adapted to be turned by a screwdriver engaging its slotted head. After the pin 43 has been set in the desired position, set screw 44 is tightened to hold the stem of the stud 42 in the selected position. Referring more especially to Fig. 3, it is obvious that, by turning the stud 42, the pin 43 will bear against the pin 34 at a point closer or farther from the rock shaft 33. The closer the bearing point of these two pins 43, 34 against each other is to the rock shaft 33, the greater will be the horizontal movement of the upper end of pin 28. This will increase the rate of movement of the pointer 16 over the dial 48.

In order to calibrate the instrument, it is connected to a system containing standard means for measuring the absolute pressure, such as a barometric tube, and a vacuum pump. The pointer 16 is set to read on the dial 48 the absolute pressure that is indicated by the barometric tube. Any necessary corrections for the effects of the temperature on the mercury in the barometric gauge may be made. By means of the vacuum pump the housing 1 is then exhausted to a low pressure. If the pointer 16 reads too high, set screw 44 is loosened and the screwdriver applied to the head of stud 42. This is turned so that the point of contact between the pin 43 and the pin 34 is moved closer to the rock shaft 33. This will increase the arc through which the pointer 16 moves for a given change in absolute pressure. The test is repeated until the arc traversed by the pointer 16 on the graduations 49 correspond with the change in barometric reading.

As the diaphragm unit 5 expands, the distance of the bearing point of pins 34 and 43 from the rock shaft 33 changes, and similarly the distance from the rock shaft 33 to the bearing point between pin 28 and arm 25, as well as the distance of that bearing point on the arm 25 from the center of the arbor 24 changes. Therefore, the rotation of the rock shaft 33 and, consequently, the resulting movement of the pointer 16 is not necessarily proportionate to the expansion vertical movement of the diaphragm unit throughout the entire range. It has been discovered, however, that the several variable factors indicated tend to balance each other so that the movement of the pointer 16 as compared with the vertical expansion of the diaphragm unit is roughly proportionate.

There may, in a given absolute pressure gauge assembly, be a tendency for the pointer to be slightly fast or slightly slow over a certain part of its range. If this takes place, stud 40 is loosened and the entire sub-plate 30, with all of the parts it carries, is swung about the stud 35. In this way, the relative effectiveness of the motion-transmitting elements at the beginning and at the end of the scale is noted. If necessary, this test is repeated accompanied by an adjustment of the stud 42 until the pressure indications by pointer 16 and those of the absolute pressure indicating barometer are the same throughout the entire measuring range.

What I claim is:

1. In an absolute pressure gauge having a chamber for the reception of fluid whose pressure is to be indicated, an evacuated pressure responsive unit in said chamber adapted to perform axial movements in accordance with changes in the pressure in said chamber, an axially tapped post secured to said pressure responsive unit for participation in said axial movement of said unit, a cap screw axially adjustable in said post, a radial pin projecting from the head of said screw, a rock shaft supported in said chamber and extending at right angles to said tapped post, an arm extending from said rock shaft and engaging the radial pin projecting from said cap screw, whereby the angular movement of the rock shaft for a given linear movement of the pressure responsive unit may be varied, a second arm projecting from said rock shaft, an indicating device having a part movable in a plane perpendicular to the direction of the axial movement of said pressure responsive unit which is actuated by said last named arm projecting from the rock shaft.

2. In an absolute pressure gauge having a chamber for the reception of fluid whose pressure is to be indicated, an evacuated pressure responsive unit in said chamber adapted to perform axial movements in accordance with changes in the pressure in said chamber, an axially tapped post secured to said pressure responsive unit for participation in said axial movement of said unit, a cap screw axially adjustable in said post, a radial pin projecting from the head of said screw, an indicating device having a part movable in a plane perpendicular to the direction of the axial movement of said pressure responsive unit, a spring biasing said unit in one direction, a rock shaft supported in said chamber and extending at right angles to said tapped post, an arm projecting from said rock shaft into contact with the indicating unit, so that the angular position of the rock shaft and the arm are determined by the position of the indicating unit, a second arm extending from said rock shaft into the path of the radial pin projecting from the cap screw, whereby a movement of the pressure responsive unit becomes effective to create an angular movement of the rock shaft only after an initial adjustable movement of the unit has brought the pin into contact with the said second arm.

LEON D. JOHNSON.

REFERENCES CITED

The following references are of record in the file of this patent:

UNITED STATES PATENTS

| Number | Name | Date |
|---|---|---|
| 1,960,745 | Luckey | May 29, 1934 |
| 2,194,624 | Titterington, Jr. | Mar. 26, 1940 |
| 2,196,932 | Menzer | Apr. 9, 1940 |

FOREIGN PATENTS

| Number | Country | Date |
|---|---|---|
| 499,569 | Great Britain | Jan. 25, 1939 |
| 592,063 | Great Britain | Sept. 5, 1947 |
| 817,600 | France | Sept. 6, 1937 |